April 11, 1950     M. T. DERBY     2,503,380
CONTAINER
Filed April 3, 1948
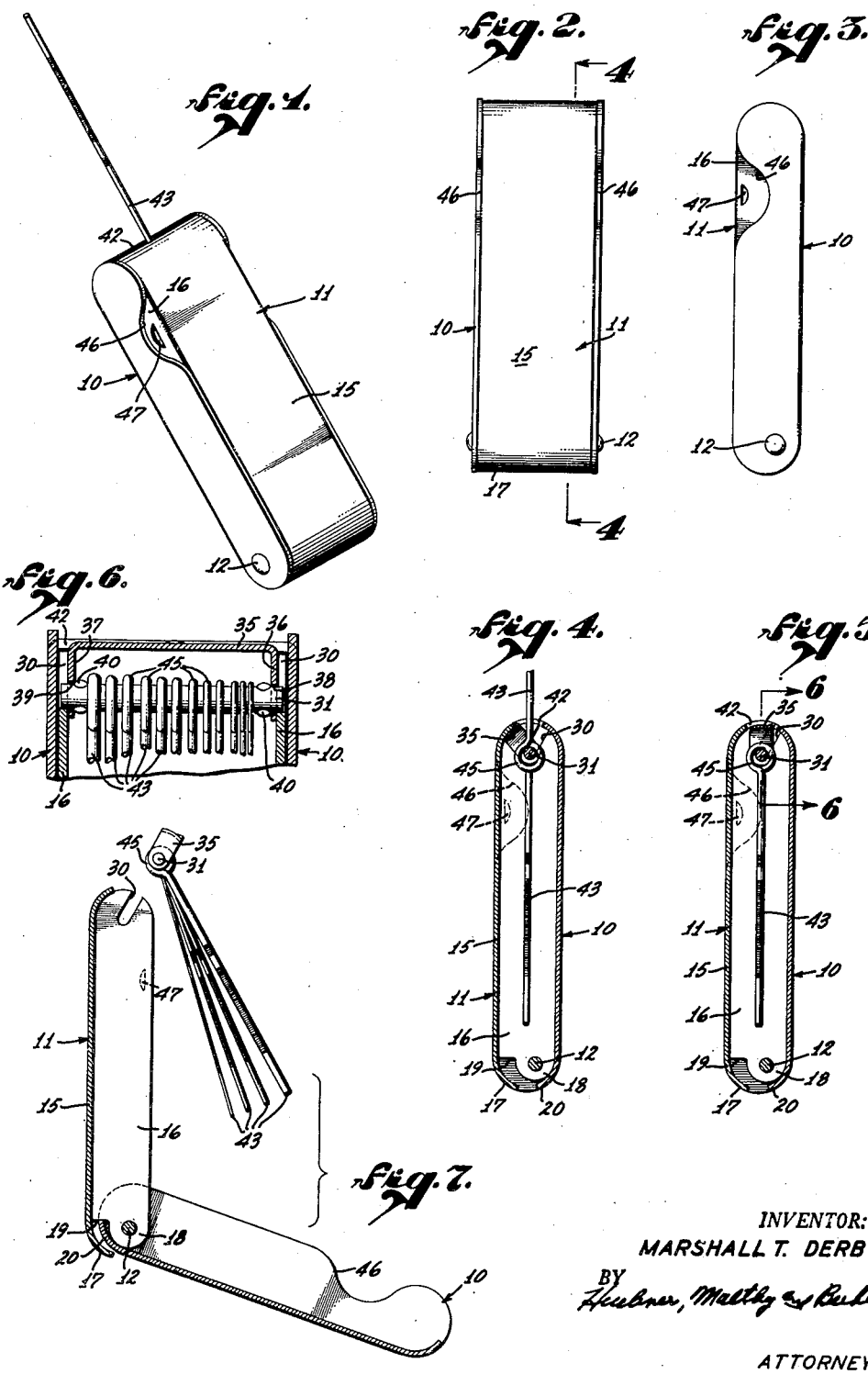
INVENTOR:
MARSHALL T. DERBY
BY
Huebner, Maltby & Becker
ATTORNEYS.

Patented Apr. 11, 1950

2,503,380

UNITED STATES PATENT OFFICE 2,503,380

CONTAINER

Marshall T. Derby, South Gate, Calif., assignor to Thermacote Company, Los Angeles, Calif., a copartnership Application April 3, 1948, Serial No. 18,739

4 Claims. (Cl. 206—37)

My invention relates to a container, and has specific reference to a case or container for a plurality of small items, such as welding tip cleaners, keys, gauges or other similar items.

Whereas, my invention is applicable for use in connection with a wide variety of small items, such as above enumerated, it was developed in connection with welding torch tip cleaners, and for purposes of illustration, will be described hereinafter in connection with such use. It is to be understood, of course, that I do not wish my invention limited to a case or container for welding torch tip cleaners.

An object of my invention is to provide a convenient and economical case for carrying a plurality of welding tip cleaners which permits a ready and easy use of the tip cleaners.

Welding tip cleaners, such as those illustrated herein, have heretofore been used and carried individually in a workman's pocket or tool box. Such a method is highly inconvenient in that the item is relatively small and difficult to find in a crowded tool box. It is an object of my invention to provide a container wherein all of the tip cleaners are segregated in one place and held in a container which is readily identifiable and easily found in such a tool box.

Another serious disadvantage to the heretofore known methods of carrying or keeping such welding tip cleaners in their individual units lies in the fact that when tools shift in the box, they are apt to bend the tip cleaner or injure the surface which, in turn, will injure a welding torch tip. A further object of my invention is to provide a case which contains the tip cleaners safely and prevents damage by shifting of tools.

In the event that dirt collects and adheres to the surface of the tip cleaners, which may be sufficiently hard, such a condition constitutes a hazard in use in that the dirt particles may scratch or mar the inside of a welding torch tip, thereby rendering the cleaner substantially useless. A further object of my invention is to provide a case which maintains the cleaners free from dirt and other deleterious substances while not in use.

Other containers, such as have been used in connection with keys, have been suggested for carrying welding tip cleaners and usually take the form of a leather case, which said case is provided with a snap fastener for closing or opening the case. It has been found that such cases containing welding tip cleaners provide no method for readily removing the cleaner from the case for use. In view of the fact that the tip cleaners are relatively short compared with the hand of a welder, the case constitutes a nuisance in cleaning operations. It is a further object of my invention to provide a means in connection with such case whereby the tip cleaners may readily be removed from the case so that the case does not have to be held in the hand while using.

Other and further objects and advantages of my invention will become apparent from the drawings and the specifications relative thereto.

In the drawings:

Figure 1 is an isometric view of a welding tip cleaner case embodying the principles of my invention.

Figure 2 is a bottom plan view of the case shown in Figure 1.

Figure 3 is a side view of the case shown in Figure 2.

Figure 4 is a sectional view taken on line 4—4 of Figure 2.

Figure 5 is a similar sectional view showing the dust cap closed to protect the tip cleaners.

Figure 6 is a partial section taken on line 6—6 of Figure 5.

Figure 7 is a side section showing the case open with the tip cleaners removed.

In general, my new and improved case comprises a top section, designated generally 10, and a bottom section, designated generally 11, hinged to said top section by means of a pintle 12 and adapted to telescope within the top 10.

It will be noted from Figure 3 that the top 10 and the bottom 11 are formed with semi-circular ends. The reason for this configuration will become apparent with a further description of the device. It will also be noted that the pintle 12 is offset from the center line of the radii of the two ends. The reason for this is apparent in Figure 7. When the inner and outer cases are pivotally separated from each other, it becomes necessary for the lower radius of one of the sections to telescope inside of the other. If the pintle 12 were on the center line, then the bottom radii of the two telescoping elements would conflict. By forming the ends, as hereinafter described, it becomes possible to maintain a substantially dust-tight end which permits a pivotal opening.

The base member 11 is formed with a back 15 and side walls 16. The back 15 is formed with a curved section 17 adapted to conform with the radii of the ends as shown in Figure 3. The side members 16 are formed with a semi-circular section 18 having a center concentric with the pintle 12, thereby defining an undercut or open section 19 into which a curved end 20 of the top 10 is adapted to rotate.

As seen in Figure 3, the upper end of the case is also formed with a semi-circular configuration. The reason for this is apparent in Figures 4 and 5.

The side wall members 16 of the base or bottom 11 are formed with a radial slot 30 adapted to receive the ends of a shaft 31. The length of the shaft is such that it will be contained in the slot 30, but will allow the sides of the top 10 to close over the bottom 11 without interfering with the shaft, thereby effectively holding the shaft in position. It will be noted from Figures 4 and 5 that the slot 30 extends radially at an angle to the center line of the case so that the outer end of the slot 30 is covered by the curved end portion of the top 10 when the case is closed.

This arrangement permits ready withdrawal or removal of the shaft 31 from the case, as shown in Figure 7, when the case is open, but effectively prevents removal of the shaft, either intentionally or accidentally, when the case is closed. A U-shaped spring retainer 35, having its upright legs 36 and 37 formed with aligned apertures 38 and 39, is disposed over the shaft 31 so that the shaft 31 extends through the apertures 38 and 39.

The shaft 31 is formed with a plurality of ears 40 against which the resilient U-shaped member 35 presses. The ears 40 prevent the upright legs 36 and 37 from moving inwardly and the resiliency of the U-shaped member 35 prevents them from moving outwardly. It will be understood that any suitable means may be employed in place of the ears 40, such as pins or shoulders, so long as they constitute an obstruction larger than the diameter of the apertures 38 and 39.

The legs 36 and 37 of the member 35 are of sufficient length to cause the outer surface of the member 35 to frictionally engage the inner surface of the upper curved end of the case so that it may be pivoted as is indicated in the two positions of Figures 4 and 5.

The purpose of such construction is as follows: It will be noted that the curved ends of the top 10 and the base 11 are spaced apart from a transverse slot 42 so that any one of a plurality of tip cleaners 43 can be extended upwardly through the transverse slot 42, thereby permitting the use of one cleaner at a time and converting the case to a substantially rigid handle. When the cleaner 43 is contained inside the case, the member 35 is rotated to such a position that it encloses the slot 42 to prevent dust or dirt from entering the case.

The cleaners 43 are formed with an eyelet 45 on the upper end thereof through which the shaft 31 is disposed, thereby containing all of the cleaners within the case.

In the event it is desired to use two or more sizes of cleaners without the necessity of opening and closing the case for each different size, the assembly may readily be removed by opening the case as is shown in Figure 7 and sliding the shaft 31 out of the slot 30.

The side walls of the top 10 are formed with an undercut section 46 adjacent the upper end thereof, and the side walls of the base 11 are formed with a coined or stamped notch 47. The purpose of this is apparent in that it permits a thumb hold or finger grip so that the inner shell or bottom 11 can be withdrawn from its telescoped position inside the top 10.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. In a case of the character described, a pair of rectangular-shaped containers, each having an open face and adapted to telescopically fit together, the side walls of each section being formed with an aperture adapted to receive a hinge pintle adjacent one end thereof, the inner of said sections being formed with a slot in each wall thereof at the other end, a shaft slidably disposed in said slots, and a resilient U-shaped retaining bracket having aligned apertures in the free ends of the upright legs of said U-shaped bracket adapted to be rotatably disposed over the ends of said shaft.

2. In a case of the character described, a pair of rectangular-shaped containers, each having an open face and adapted to telescopically fit together, the side walls of each section being formed with an aperture adapted to receive a hinge pintle adjacent one end thereof, said hinge pintle being disposed in offset relation to the center line of the sections, the inner of said sections being formed with a slot in each wall thereof at the other end, a shaft slidably disposed in said slots, and a resilient U-shaped retaining bracket having aligned apertures in the free ends of the upright legs of said U-shaped bracket adapted to be rotatably disposed over the ends of said shaft.

3. In a case of the character described, a pair of rectangular-shaped containers, each having an open face and adapted to telescopically fit together, the side walls of each section being formed with an aperture adapted to receive a hinge pintle adjacent one end thereof, said hinge pintle being disposed in offset relation to the center line of the sections, the inner of said sections being formed with a slot in each wall thereof at the other end, said slot being oblique to the center line of said section, a shaft slidably disposed in said slots, and a resilient U-shaped retaining bracket having aligned apertures in the free ends of the upright legs of said U-shaped bracket adapted to be rotatably disposed over the ends of said shaft.

4. In a case of the character described, a pair of rectangular-shaped containers, each having an open face and adapted to telescopically fit together, the side walls of each section being formed with an aperture adapted to receive a hinge pintle adjacent one end thereof, said hinge pintle being disposed in offset relation to the center line of the sections, the inner of said sections being formed with a slot in each wall thereof at the other end, said slot being oblique to the center line of said section, a shaft slidably disposed in said slots, said shaft being formed with enlarged sections adjacent the ends thereof, and a resilient U-shaped retaining bracket having aligned apertures in the free ends of the upright legs of said U-shaped bracket adapted to be rotatably disposed over the ends of said shaft.

MARSHALL T. DERBY.

REFERENCES CITED

The following references are of record in the file of this patent:

UNITED STATES PATENTS

| Number | Name | Date |
|---|---|---|
| 882,557 | Gathright | Mar. 24, 1908 |
| 1,779,621 | Moore | Oct. 28, 1930 |
| 1,837,151 | Edwards | Dec. 15, 1931 |
| 1,850,718 | Henderson | Mar. 22, 1932 |